US008949739B2

(12) United States Patent  (10) Patent No.: US 8,949,739 B2
Laughlin  (45) Date of Patent: Feb. 3, 2015

(54) CREATING AND MAINTAINING IMAGES OF BROWSED DOCUMENTS

(75) Inventor: Chetley T. Laughlin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 472 days.

(21) Appl. No.: 13/283,608

(22) Filed: Oct. 28, 2011

(65) Prior Publication Data

US 2013/0111368 A1  May 2, 2013

(51) Int. Cl.
G06F 3/0481 (2013.01)
G06F 17/30 (2006.01)

(52) U.S. Cl.
CPC ............... *G06F 17/30899* (2013.01)
USPC ..................................... 715/838

(58) Field of Classification Search
USPC ..................................... 709/227
See application file for complete search history.

(56) References Cited

U.S. PATENT DOCUMENTS

| 6,041,360 | A | 3/2000 | Himmel et al. |
| 6,356,908 | B1 | 3/2002 | Brown et al. |
| 6,724,403 | B1 | 4/2004 | Santoro et al. |
| 7,437,370 | B1* | 10/2008 | Ershov .................................. 1/1 |
| 7,933,632 | B2 | 4/2011 | Flynt et al. |
| 2002/0078093 | A1 | 6/2002 | Samaniego et al. |
| 2002/0194095 | A1 | 12/2002 | Koren |
| 2003/0079179 | A1* | 4/2003 | Brown et al. ............... 715/501.1 |
| 2004/0049541 | A1* | 3/2004 | Swahn ........................... 709/203 |
| 2005/0216526 | A1* | 9/2005 | Kumagai ....................... 707/201 |
| 2006/0145831 | A1 | 7/2006 | Bornhoevd et al. |
| 2006/0224624 | A1* | 10/2006 | Korn et al. ................... 707/104.1 |
| 2007/0192726 | A1* | 8/2007 | Kim et al. ..................... 715/781 |
| 2008/0195674 | A1 | 8/2008 | Kim et al. |
| 2008/0222273 | A1 | 9/2008 | Lakshmanan et al. |
| 2008/0282196 | A1* | 11/2008 | Park .............................. 715/838 |
| 2009/0164639 | A1* | 6/2009 | Sylvain ........................ 709/227 |
| 2009/0259934 | A1* | 10/2009 | Prisament .................... 715/234 |
| 2011/0138313 | A1 | 6/2011 | Decker et al. |
| 2011/0191314 | A1 | 8/2011 | Howes et al. |

FOREIGN PATENT DOCUMENTS

WO  03094474 A1  11/2003

OTHER PUBLICATIONS

Kaashoek, et al., "Dynamic Documents: MobileWireless Access to the WWW", Retrieved at <<http://ieeexplore.ieee.org/stamp/stamp.jsp?tp=&arnumber=513480>>, Proceedings of the IEEE Workshop on Mobile Computing Systems and Applications, Dec. 8-9, 1994, pp. 179-184.
"Cascading & Tiling browser tabs", Retrieved at <<http://www.runboard.com/bsusassunroom.p471354>>, Retrieved Date: Jul. 26, 2011, pp. 6.
"International Search Report", Mailed Date: Feb. 21, 2013, Application No. PCT/US2012/061758, Filed Date: Oct. 25, 2012, pp. 10.

* cited by examiner

*Primary Examiner* — Phenuel Salomon
(74) *Attorney, Agent, or Firm* — John Jardine; Kate Drakos; Micky Minhas (57) ABSTRACT

Embodiments automatically create dynamic thumbnail images corresponding to accessed web pages. Thumbnails, snapshots, or other images are generated for each of a plurality of the web pages (e.g., viewed or visited by a user, or pre-fetched by a browser). The images are provided to the user as, for example, active tiles in a browser tab or on a desktop background. As content on the web pages updates, the images are re-created and visually distinguished from other images to enable the user to quickly identify the images that correspond to updated web pages. The user interacts with the images to view the corresponding web pages.

20 Claims, 8 Drawing Sheets

CREATING AND MAINTAINING IMAGES OF BROWSED DOCUMENTS

BACKGROUND

Some data available from the Internet is updated often. For example, stock prices change, bids are placed on auction, news stories are added, blog entries are posted, shopping deals are found, and the like. While some existing browsers maintain a history of locations visited by a user and cache data viewed by the user, devices with limited memory quickly discard the cached data. Further, many users consistently re-visit particular web pages multiple times throughout a given day to look for updated data. With some existing systems, the users have to launch a web browser and then navigate to each of the individual web sites of interest. Considerable time may be spent by the users while attempting to stay current.

SUMMARY

Embodiments of the disclosure provide dynamic thumbnail images corresponding to web pages viewed by a user. A computing device creates images for each of the web pages accessed by the user. One or more of the created images are provided for display to the user on the computing device. After one or more of the web pages are subsequently updated, the image of the updated web page is re-created and visually distinguished from the images corresponding to web pages that have not been updated. The visually distinguished, re-created images are presented for display to the user on the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable the automatic creation and maintenance of dynamic thumbnail images 114 corresponding to documents viewed by a user 102. The dynamic thumbnail images 114 enable the user 102 to quickly determine whether the documents corresponding to the dynamic thumbnail images 114 have been updated. For example, the dynamic thumbnail images 114 corresponding to updated documents are flagged or otherwise visually distinguished from the dynamic thumbnail images 114 corresponding to documents that have not been updated.

In some embodiments, the dynamic thumbnail images 114 are automatically created as active tiles displayed in a browser tab or on a desktop background of a computing device 104 of the user 102. For example, the dynamic thumbnail images 114 represent snapshots of web pages 214 accessed by the user 102. While described below in some embodiments with respect to web pages 214, mobile computing devices, and active tiles, aspects of the disclosure are not limited as such and instead are operable with any documents, devices, and images.

Aspects of the disclosure further enable the user 102 to "glance and go" by viewing the dynamic thumbnail images 114 to determine whether the corresponding document or other content has been updated, without having to execute the application 212 associated with the document. The user 102 is able to customize display of the dynamic thumbnail images 114 by selecting which documents to be represented by the images 114, and which images 114 to be shown in a browser tab or home screen.

Figure 1:
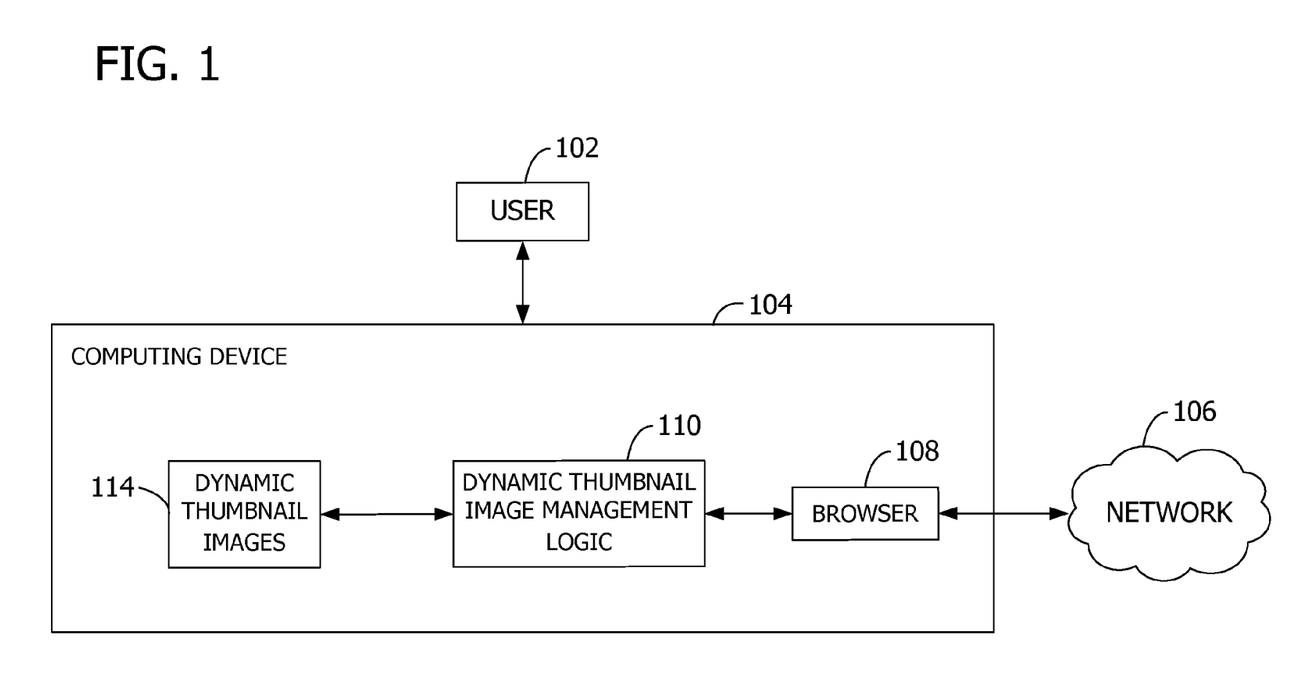
FIG. 1 is an exemplary block diagram illustrating a computing device with a browser accessing a network such as the Internet.

Referring next to FIG. 1, an exemplary block diagram illustrates the computing device 104 with a browser 108 accessing a network 106. In the example of FIG. 1, the user 102 interacts and/or operates the computing device 104. The computing device 104 executes at least the browser 108 that is used to obtain content from other computing devices via the network 106. For example, the computing device 104 executes the browser 108 to access web sites via the Internet.

The computing device 104 further executes dynamic thumbnail image management logic 110, such as illustrated and described below with reference to FIG. 3 and/or FIG. 4. The dynamic thumbnail image management logic 110 operates to cache copies of web pages 214 from the browser 108, and create and maintain dynamic thumbnail images 114 in a browser tab, on the desktop, or on the home screen of the user 102. For example, the logic 110 calls application programming interfaces (APIs) associated with the dynamic thumbnail images 114 to create and render the dynamic thumbnail images 114. The logic 110 also translates commands sent to the browser 108 to determine whether web page updates have occurred and to obtain those updates.

Figure 2:
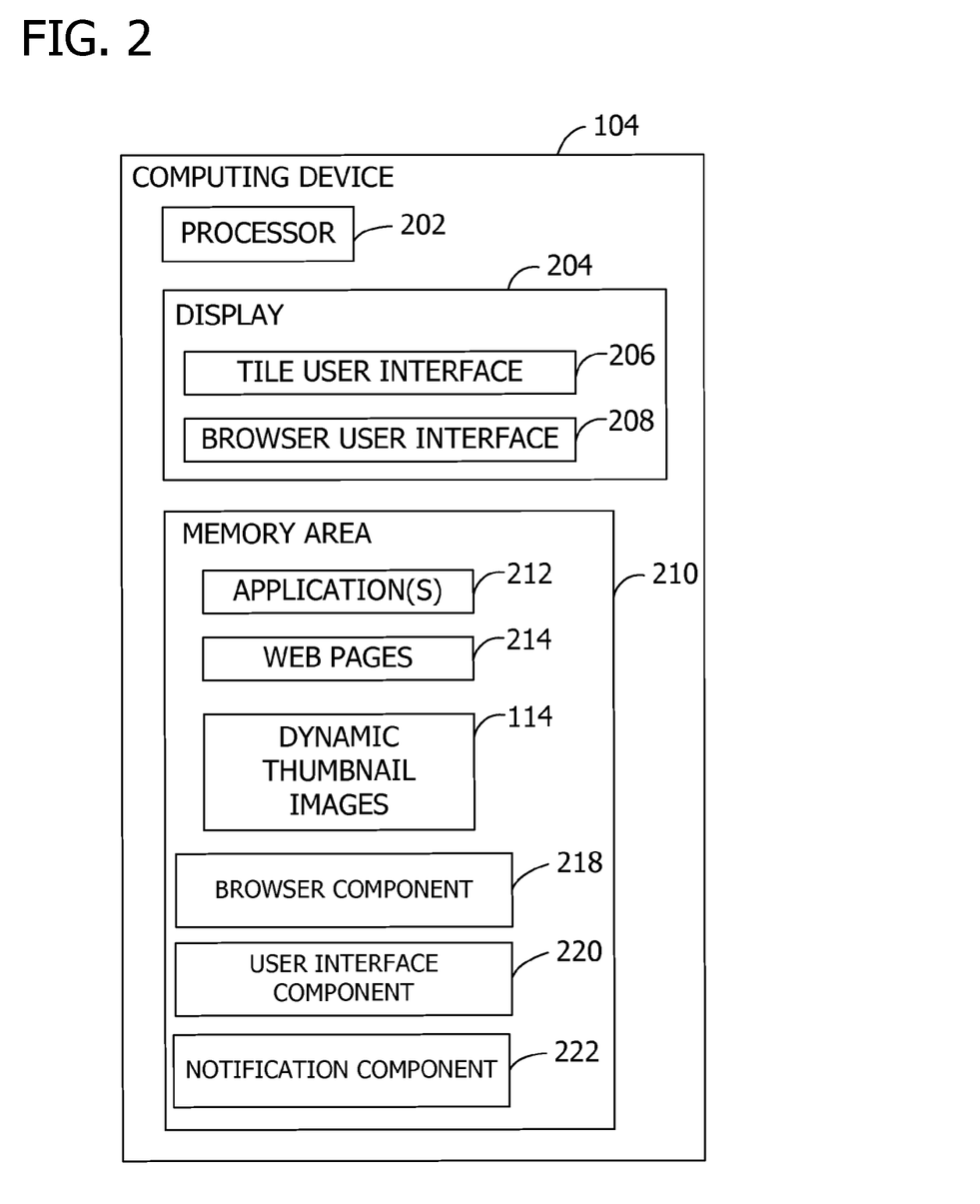
FIG. 2 is an exemplary block diagram illustrating the computing device having a memory area storing web pages and dynamic thumbnail images based thereon.

Referring next to FIG. 2, an exemplary block diagram illustrates the computing device 104 having a memory area 210 storing web pages 214 and dynamic thumbnail images 114 based thereon. In the example of FIG. 2, the computing device 104 represents a system for providing dynamic thumbnail images 114 corresponding to web pages 214 on the computing device 104. The computing device 104 represents any device executing instructions (e.g., as application programs, operating system functionality, or both) to implement the operations and functionality associated with the computing device 104. The computing device 104 may include a mobile computing device or any other portable device. In some embodiments, the mobile computing device includes a mobile telephone, laptop, tablet, computing pad, netbook, gaming device, and/or portable media player. The computing device 104 may also include less portable devices such as desktop personal computers, kiosks, and tabletop devices. Additionally, the computing device 104 may represent a group of processing units or other computing devices.

The computing device 104 has at least one processor 202, at least one display 204, and the memory area 210. The processor 202 includes any quantity of processing units, and is programmed to execute computer-executable instructions for implementing aspects of the disclosure. The instructions may be performed by the processor 202 or by multiple processors executing within the computing device 104, or performed by a processor external to the computing device 104. In some embodiments, the processor 202 is programmed to execute instructions such as those illustrated in the figures (e.g., FIG. 3 and/or FIG. 4).

In some embodiments, the display 204 includes any means for displaying data to the user 102 and/or receiving data from the user 102. The display 204 may include a touch screen display or any other form of display. The display 204 may have associated therewith a graphics card and computer-executable instructions (e.g., a driver) for operating the graphics card.

The display 204 may include one or more user interfaces, portions, or views that may be displayed at the same time, at different times, adjacent to each other, overlaid with one another, and/or any of the above. In some embodiments, the user interfaces are windows that may be positioned on the display 204. In the example of FIG. 2, the display 204 includes at least a tile user interface 206 and a browser user interface 208. The tile user interface 206 represents an area for displaying one or more tiles. Tiles enable the user 102 to view content and/or perform functions without navigating away from the tile user interface 206. For example, the tile user interface 206 may correspond to a home screen on a mobile computing device and/or a desktop background on the computing device 104. The tile user interface 206 is separate from the browser user interface 208.

The browser user interface 208 represents an area for displaying output from the browser 108. The browser 108 represents any application 212 or logic for enabling the user 102 to obtain content from another computing device or from a process executing on the computing device 104. The browser 108 may be, for example, a web browser.

The computing device 104 further has one or more computer readable media such as the memory area 210. The memory area 210 includes any quantity of media associated with or accessible by the computing device 104. The memory area 210 may be internal to the computing device 104 (as shown in FIG. 2), external to the computing device 104 (not shown), or both (not shown).

The memory area 210 stores, among other data, one or more applications 212. The applications 212, when executed by the processor 202, operate to perform functionality on the computing device 104. Exemplary applications 212 include mail application programs, web browsers, calendar application programs, address book application programs, messaging programs, media applications, location-based services, search programs, and the like. The applications 212 may communicate with counterpart applications or services such as web services accessible via the network 106. For example, the applications 212 may represent downloaded client-side applications that correspond to server-side services executing in a cloud.

The memory area 210 further stores one or more web pages 214. The web pages 214 may include web pages 214 viewed by the user 102, visited by the user 102, and/or obtained by the computing device 104 without the user 102 viewing and/or visiting the web pages 214 (e.g., the computing device 104 pre-fetches or pre-caches some of the web pages 214). The memory area 210 also stores one or more dynamic thumbnail images 114 corresponding to one or more of the web pages 214. The dynamic thumbnail images 114 may be images of any size, but represent snapshots of at least a portion of one or more of the web pages 214, in some embodiments, and are smaller in size than the web pages 214. In this manner, the dynamic thumbnail images 114 consume less memory and less processing resources on the computing device 104 than the cached web pages 214.

The dynamic thumbnail images 114 may include a representation of the entire corresponding web page 214, or a portion thereof. For example, one of the dynamic thumbnail images 114 may include the upper-left portion of the web page 214 (e.g., 173 pixels×173 pixels).

The dynamic thumbnail images 114 may be active images, icons, or tiles such that the user 102 is able to view the corresponding web pages 214 by interacting with the dynamic thumbnail images 114. For example, the user 102 may click, double-click, tap, activate, or otherwise select one of the dynamic thumbnail images 114 to prompt display of the web page 214 corresponding to the dynamic thumbnail image 114. Display of the web page 214 may occur through the browser 108, or through a non-browser utility such as an image viewing application (e.g., with hyperlinks disabled). In other embodiments, other actions may be performed in response to the user 102 interaction with the images 114. For example, the user 102 may select one of the images 114 to indicate a "like" or "dislike" of the corresponding web page 214. In this example, the computing device 104 conveys the "like" or "dislike" to another device or process.

The memory area 210 further stores one or more computer-executable components. Exemplary components include a browser component 218, a user interface component 220, and a notification component 222. Execution of the computer-executable components is described below with reference to FIG. 4.

In some embodiments (not shown), the computing device 104 includes a network interface card and/or computer-executable instructions (e.g., a driver) for operating the network interface card.

Figure 3:
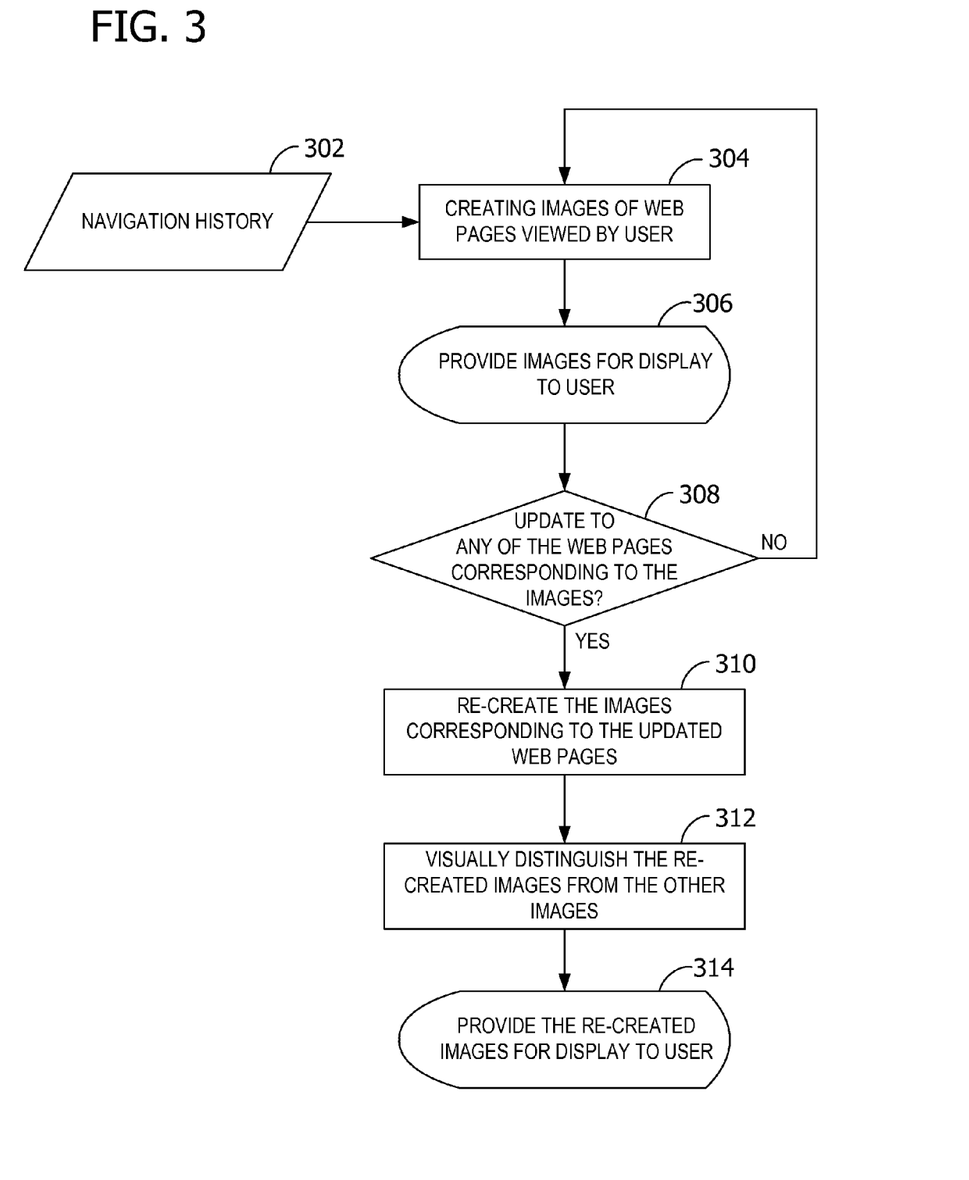
FIG. 3 is an exemplary flow chart illustrating operation of the computing device to maintain dynamic thumbnail images based on a navigation history of a user.

Referring next to FIG. 3, an exemplary flow chart illustrates operation of the computing device 104 to maintain dynamic thumbnail images 114 based on a navigation history 302 of the user 102. The operations illustrated in FIG. 3 may be performed by the computing device 104. In other embodiments, one or more operations illustrated in FIG. 3 are performed by a third-party entity such as a web service or a cloud service. For example, the cloud service performs the operations and provides the output to the computing device 104.

The navigation history 302 of the user 102 is created and/or maintained by, for example, the browser 108 executing on the computing device 104. In some embodiments, the navigation history 302 identifies a set and/or sequence of web pages 214. The navigation history 302 may also include copies of the set and/or sequence of web pages 214 (e.g., a browser cache). The computing device 104 automatically caches each of the web pages 214 viewed, visited, or otherwise accessed by the user 102. The cached web pages 214 are also available for quick navigation from the cache by the user 102 (e.g., without reloading the web pages 214 from the Internet).

At 304, the computing device 104 creates images 114 for each of a plurality of the web pages 214 accessed by the user 102. The images 114 represent a snapshot of each of the web pages 214 from the navigation history 302. At 306, one or more of the images 114 are provided for display to the user 102. Each of the images 114 may be provided for display, or a subset of the images 114 may be provided. For example, the user 102 may select images 114 of interest by dragging and dropping the images 114 onto a home screen or desktop background. The user 102 may also reorder or reorganize the displayed images 114.

In some embodiments, the computing device 104 displays the images 114 to the user 102. In an example in which the cloud service performs the creation at 304, the cloud service provides the images 114 to the computing device 104 for display, by the computing device 104, to the user 102. The created images 114 may be provided for display to the user 102 within the context of the browser 108 (e.g., in a tab) or outside the context of the browser 108. For example, the images 114 may be provided for display on a home screen of a mobile telephone. In another example, the images 114 may be provided for display on the wallpaper or other background of a desktop computer.

The computing device 104 detects at 308 whether there has been an update to any of the web pages 214 in the navigation history 302. In some embodiments, the computing device 104 retrieves at least a portion (e.g., a header) of each of the web pages 214 to determine whether content on that web page 214 has changed. For example, if the retrieved header matches the header stored in the navigation history 302, the computing device 104 concludes that the web page 214 has not changed and the rest of the web page 214 is not downloaded. This reduces the amount of data transmitted over the network 106. If the retrieved header indicates that content on the web page 214 has changed at 308, the computing device 104 obtains the updated web page 214 and re-recreates the images 114 at 310 corresponding to the updated web page 214. In some embodiments, the computing device 104 determines whether there is an update without the user 102 actively navigating to each of the web pages 214. For example, the computing device 104 checks for updates in the background at periodic intervals regardless of user activity.

At 312, the computing device 104 applies a visual markup to, or otherwise visually distinguishes, the re-created images 114 from other images 114 (e.g., images 114 corresponding to web pages 214 that have not been updated) to indicate to the user 102 that the corresponding web pages 214 have updated content. The visual markup or enhancement may be implemented as template or overlay on the re-created images 114. The visually distinguished, re-created images 114 are provided for display to the user 102 at 314. For example, the computing device 104 displays the re-created images 114 to the user 102. In an example in which the cloud service performs the recreation at 310 and visually distinguishing at 312, the cloud service provides the re-created images 114 to the computing device 104 for display, by the computing device 104, to the user 102. In an example, the computing device 104 visually distinguishes the re-created images 114 by drawing a border around the re-created images 114, highlighting the re-created images 114, blinking the re-created images 114, changing the color or style of the re-created images 114, causing the re-created images 114 to glow, applying a zoom scale factor to the re-created images 114, pointing an arrow towards each of the re-created images 114, animating the re-created images 114 to reveal a word such as "update" or "new," animating the re-created images 114 to make a character or icon (e.g., exclamation point) fade in and out on the images 114, and/or performing any other alteration to the re-created images 114. In some embodiments, different alterations are applied to different re-created images 114.

The computing device 104 maintains the visual markups on the re-created images 114 for a particular time duration, until the computing device 104 has displayed the re-created images 114 to the user 102 a particular number of times (e.g., the number of times the home screen has been displayed), or until the user 102 acknowledges seeing the update on a particular re-created image 114. The computing device 104 then removes one or more of the visual markups from the re-created images 114.

In some embodiments, the operations 308, 310, 312, and 314 are performed by the computing device 104 without explicit input from the user 102 (e.g., performed in the background). In this manner, the web pages 214 are kept updated and available for prompt display to the user 102.

A predefined quantity of the dynamic thumbnail images 114 may be designated to be maintained. The predefined quantity may represent the web pages 214 most recently accessed by the user 102, the web pages 214 most frequently visited by the user 102, or web pages 214 selected based on other criteria. The predefined quantity may be adjusted by the user 102 via a user interface dialog to balance memory and/or processor use, by the computing device 104 or operating system executing on the computing device 104, or a combination of any of the above. For example, if the user 102 visits more web pages 214 than the predefined quantity, the extra web pages 214 are cached as "offline" web pages 214.

Figure 4:
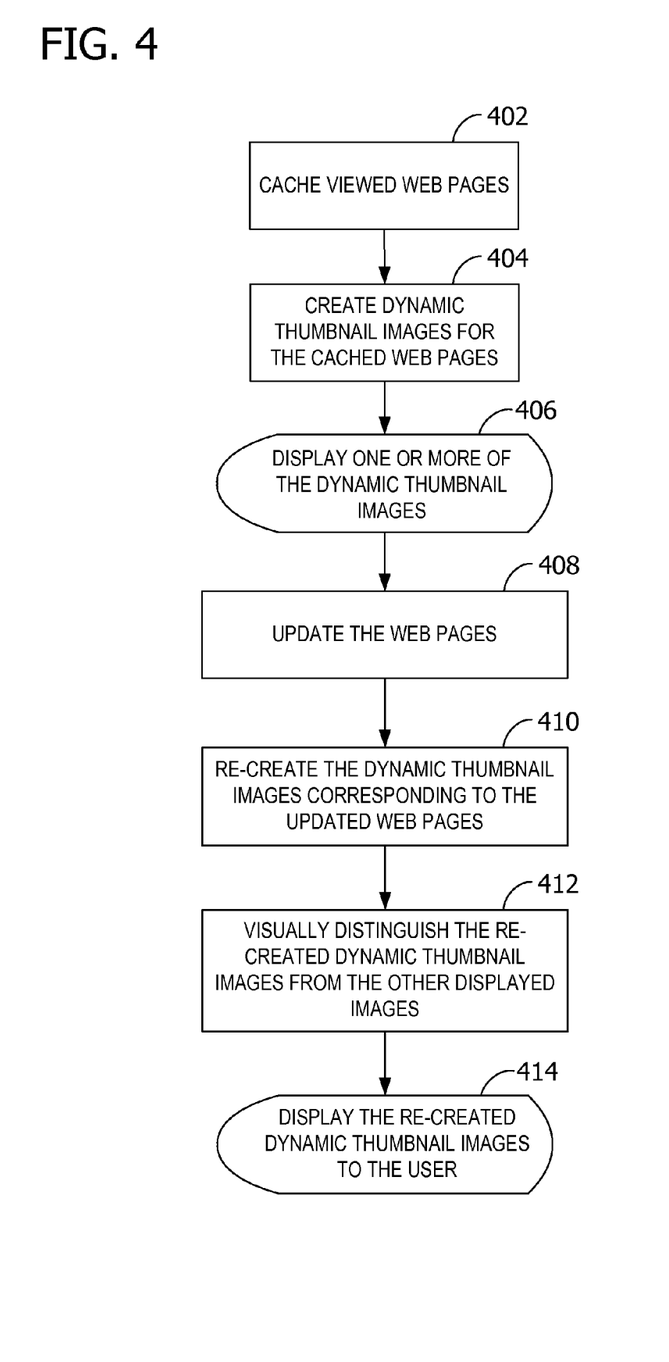
FIG. 4 is an exemplary flow chart illustrating operation of the computing device to cache web pages viewed by the user and to maintain dynamic thumbnail images based thereon.

Referring next to FIG. 4, an exemplary flow chart illustrates operation of the computing device 104 to cache web pages 214 viewed by the user 102 and to maintain dynamic thumbnail images 114 based thereon. The computing device 104 caches the web pages 214 viewed by the user 102, visited by the user 102, and/or pre-fetched by the computing device 104 on behalf of the user 102 at 402. The computing device 104 creates one or more of the dynamic thumbnail images 114 for one or more of the cached web pages 214 at 404. In some embodiments, the computing device 104 displays one or more of the dynamic thumbnail images 114 to the user 102 at 406 in the tile user interface 206. For example, the dynamic thumbnail images 114 may be displayed on the desktop of the user 102 or elsewhere outside the context of the browser 108.

The computing device 104 updates (e.g., periodically) the web pages 214 at 408, without the user 102 actively navigating to each web page 214 (e.g., and reloading the content). For example, the computing device 104 may update each of the web pages 214 at a regular interval (e.g., check every hour) or according to another schedule. The interval may be set by the user 102, by the computing device 104, and/or by an operating system executing on the computing device 104. In some embodiments, all cached web pages 214 may be checked for updates at the same time to optimize use of computing device resources (e.g., an active cellular stack on a mobile computing device). In other embodiments, the computing device 104 staggers the update checks across time windows to reduce the processing impact on the computing device 104, thereby preventing detection by the user 102 of any processing delays.

In some embodiments, the computing device 104 adjusts the schedule for updating the web pages 214 based on a state of the computing device 104. In an example in which the computing device 104 is a mobile computing device, the state of the mobile computing device corresponds to one or more of the following of the mobile computing device: battery level, roaming status, signal strength, user interaction with the mobile computing device, quantity of applications 212 executing on the mobile computing device, available memory capacity, and bootup progress. The mobile computing device may adjust the schedule for updating the web pages 214 by, for example, disabling update checks if the batter level of the mobile computing device is below a particular threshold (e.g., 10%). In another example, the mobile computing device disables or reduces the frequency of update checks if the network connection of the mobile computing device is roaming (e.g., to prevent or reduce incurring roaming charges).

In still another example, the mobile computing device updates each of the dynamic thumbnail images 114 after bootup of the mobile computing device. In this example, the mobile computing device may postpone the updates until bootup operations have completed to allow the user 102 to make voice calls faster after bootup and/or to reduce bootup time. The length of time that the updates are postponed may vary based on each particular mobile computing device. Alternatively or in addition, the updates may be postponed until the user 102 tries to view the dynamic thumbnail images 114.

For each of the updated web pages 214, the computing device 104 re-creates the dynamic thumbnail image 114 at 410 and visually distinguishes the re-created dynamic thumbnail image 114 at 412 from the other displayed dynamic thumbnail images 114 (e.g., that correspond to web pages 214 that have not been updated). The computing device 104 displays the visually distinguished, re-created dynamic thumbnail images 114 to the user 102 at 414 in the tile user interface 206.

In some embodiments, upon activation or selection of one of the dynamic thumbnail images 114 by the user 102, the computing device 104 displays the web page 214 corresponding to the selected dynamic thumbnail image 114 to the user 102 in the browser user interface 208 (e.g., in a browser window).

The computer-executable components execute to perform the operations illustrated in FIG. 4. For example, the browser component 218, when executed by the processor 202, causes the processor 202 to cache a plurality of web pages 214 accessed by the user 102 with the computing device 104. The user interface component 220, when executed by the processor 202, causes the processor 202 to receive a request from the user 102 to create a thumbnail image 114 of at least one of the web pages 214 cached by the browser component 218. The user interface component 220 further creates and provides the thumbnail image 114 for display to the user 102 on the computing device 104 in response to the received request.

The browser component 218 subsequently updates the web page 214 corresponding to the created thumbnail image 114. The notification component 222, when executed by the processor 202, causes the processor 202 to re-create the thumbnail image 114 corresponding to the updated web page 214 and to alter the re-created thumbnail image 114 to indicate to the user 102 that the corresponding web page 214 has been updated. The user interface component 220 presents the altered, re-created image 114 for display to the user 102 on the computing device 104.

In some embodiments, the user interface component 220 further receives a request from the user 102 via the re-created thumbnail image 114 to display the updated web page 214. In response, the browser component 218 executes the browser 108 to display the updated web page 214 to the user 102. In such an embodiment, the re-created thumbnail image 114 is no longer marked as updated after the user 102 performs such an action.

If the user interface component 220 creates a plurality of thumbnail images 114 that exceeds a predefined quantity available for display on the computing device 104 (e.g., due to display size limitations), the computing device 104 displays only the predefined quantity of the plurality of thumbnail images 114. In such embodiments, the notification component 222 provides an indicator to the user 102 that at least one of the created thumbnail images 114 not displayed on the computing device 104 has an updated web page 214 corresponding thereto. For example, an arrow, message, or other indicator may be displayed to the user 102 showing that more thumbnail images 114 are available by scrolling.

Figure 5:
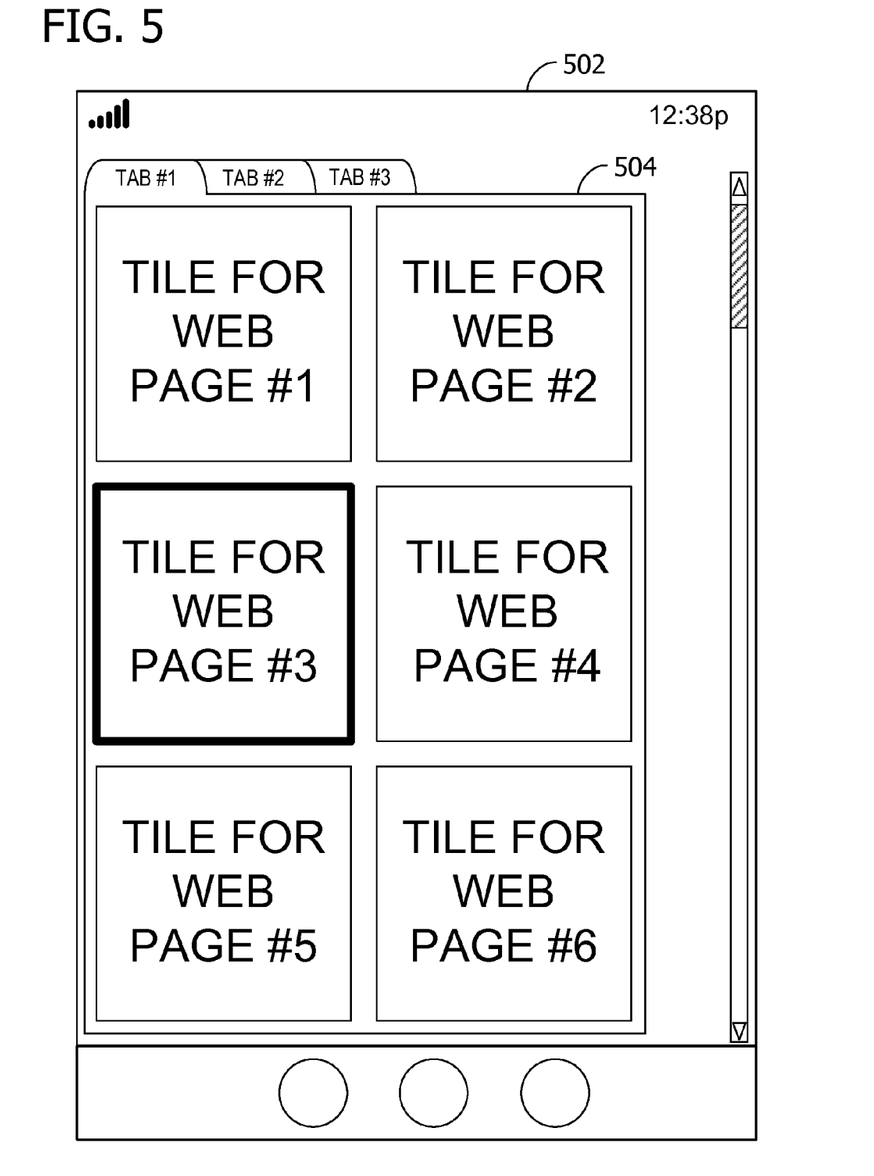
FIG. 5 is an exemplary mobile computing device displaying the dynamic thumbnail images as tiles in a tab in a browser.

Referring next to FIG. 5, an exemplary mobile computing device 502 displays the dynamic thumbnail images 114 as tiles (e.g., in a tab) in a browser 504. For example, the user 102 navigates among different tabs using the buttons indicated at the bottom of FIG. 5 and/or using a menu system. In the example of FIG. 5, the mobile computing device 502 executes the browser 504. The browser 504 represents, for example, the browser user interface 208, and includes one tab for displaying the dynamic thumbnail images 114 as active tiles and two additional tabs displaying web pages 214. The tab displaying the dynamic thumbnail images 114 includes six tiles. The tiles corresponding to web content that has been updated since the user 102 last viewed the web content are indicated by dark highlighting around the border of the tiles. In this example, web page #3 has been updated. The content (not shown) displayed within the tiles also represents the updated web content. Upon selection by the user 102 of at least one of the tiles, the browser 504 presents the web content corresponding to the selected tile (e.g., in a new tab) and the selected tile is no longer visually distinguished from the other, non-updated tiles.

Figure 6:
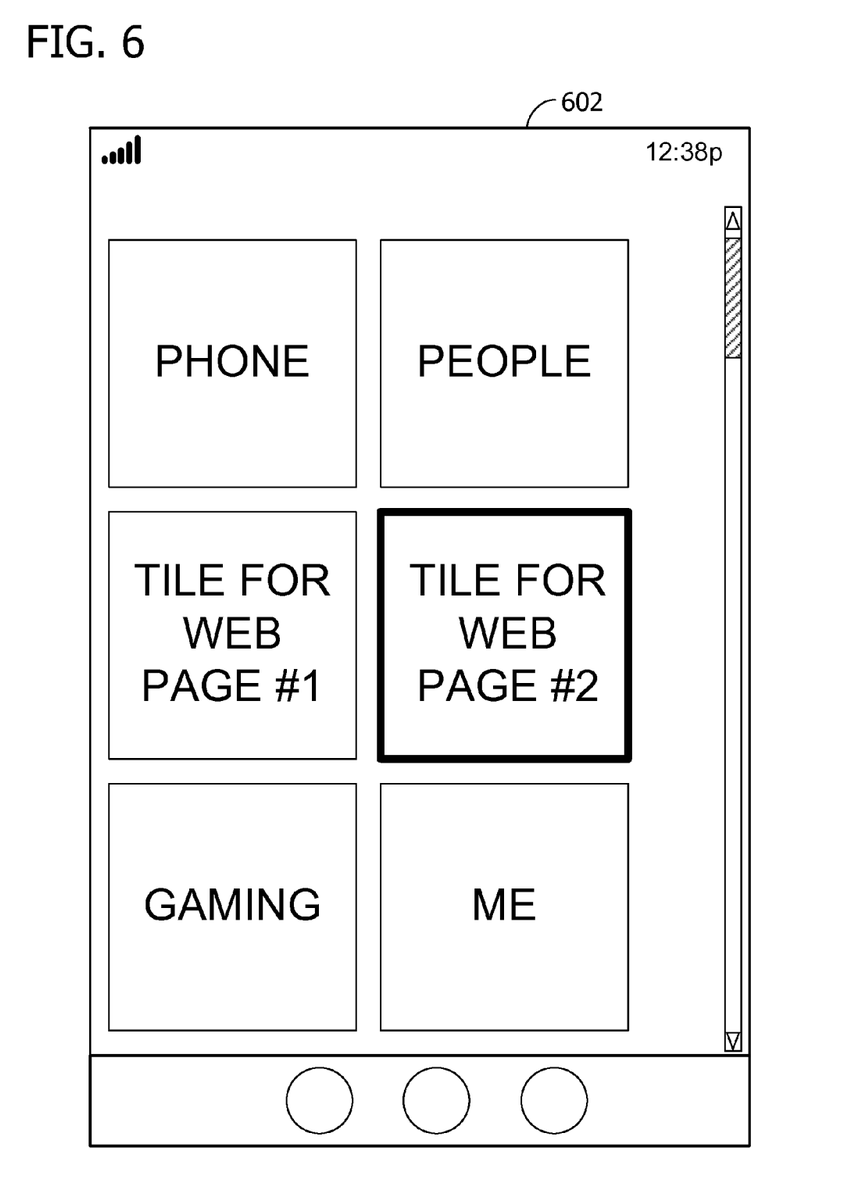
FIG. 6 is an exemplary mobile computing device displaying the dynamic thumbnail images as tiles on a home screen of the mobile computing device.

Referring next to FIG. 6, an exemplary mobile computing device 602 displays the dynamic thumbnail images 114 as tiles on a home screen of the mobile computing device 602. In the example of FIG. 6, the mobile computing device 602 includes a home screen that represents an entry point into launching applications 212 available for execution by the mobile computing device 602. The home screen may also represent an entry point for launching a system component (e.g., functionality available from an operating system executing on the mobile computing device 602). The home screen may show a summary of information of interest to the user 102, and may appear after bootup of the mobile computing device 602. The home screen may also represent an entry point or launching point into other functionality available on the mobile computing device 602. The dynamic thumbnail images 114 are displayed as two active tiles on the home screen in the example of FIG. 6. For example, the user 102 may select which tiles to display on the home screen, or the mobile computing device 602 may select which tiles for display (e.g., based on frequency of visits by the user 102 to the web pages 214, or other criteria). The user 102 may also add, delete, or move tiles.

In this example, web page #2 has updated content to display to the user 102 as indicated by the solid dark border around the tile.

Figure 7:
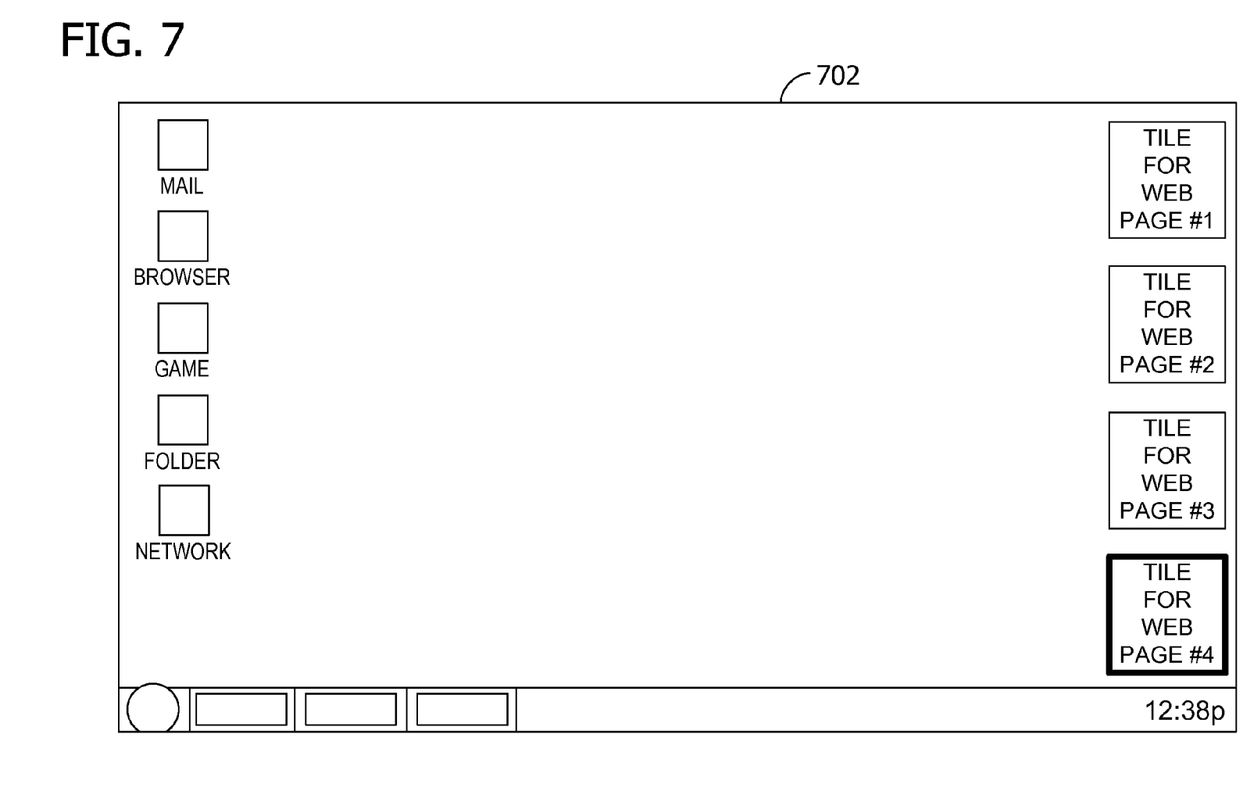
FIG. 7 is an exemplary computing device displaying the dynamic thumbnail images as tiles on a desktop of the computing device.

Referring next to FIG. 7, an exemplary computing device displays the dynamic thumbnail images 114 as tiles on a desktop 702 of the computing device. In contrast with the examples illustrated in FIG. 5 and in FIG. 6, the computing device in FIG. 7 is a non-mobile device such as a server or desktop computer. The dynamic thumbnail images 114 are displayed as active tiles on the desktop 702 of the computing device. Similar to the examples of FIG. 5 and FIG. 6, the user 102 is able to select at least one of the active tiles to be presented with the web page 214 corresponding thereto. For example, the computing device executes a browser upon detecting selection by the user 102 of at least one of the active tiles. The browser displays the web page(s) corresponding to the selected tile. For example, the browser may load the web page 214 from a cache or may obtain the web page 214 from a content provider associated with the web page 214 (e.g., download the web page 214 from the Internet).

In this example, web page #4 has updated content to display to the user 102 as indicated by the solid dark border around the tile.

Figure 8:
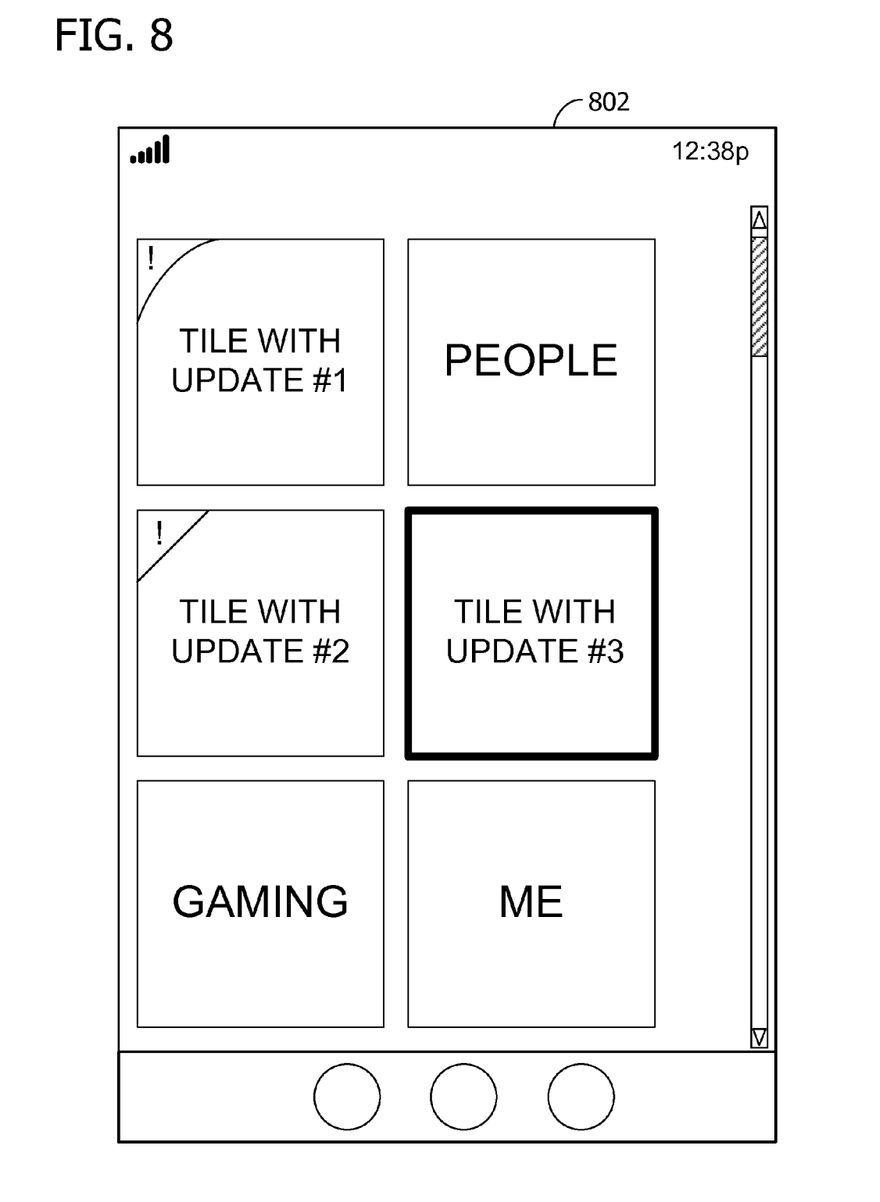
FIG. 8 is an exemplary mobile computing device displaying tiles on a home screen of the mobile computing device modified with various styles to indicate updates.

Referring next to FIG. 8, an exemplary mobile computing device 802 displays tiles on a home screen of the mobile computing device 802 modified with various styles to indicate updates. In the example of FIG. 8, updated content is available for three of the tiles. One style for indicating the availability of updated content is an exclamation point in the upper left corner of the tile, such as in the tile with update #1 and in the tile with update #2. Another style is a darker or thicker border around the tile with updated content, such as in the tile with update #3.

In another embodiment, the exclamation point, fill within the portion enclosing the exclamation point, or border color may be changed to a color that is different from tiles that do not have updated content. For example, the color may be complementary to the current color scheme of the user interface. Further, the exclamation point may be replaced or supplemented with any icon, character, ideograph, or the like meant to draw the user's attention to the tile. For example, the exclamation point may be replaced with an eye.

ADDITIONAL EXAMPLES

At least a portion of the functionality of the various elements in FIG. 1 and FIG. 2 may be performed by other elements in FIG. 1 and/or FIG. 2, or an entity (e.g., processor, web service, server, application program, computing device, etc.) not shown in FIG. 1 and/or FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 102. In such embodiments, notice is provided to the users 102 of the collection of the data (e.g., via a dialog box or preference setting) and users 102 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Computer storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for providing dynamically updated thumbnail images 114 corresponding to web pages 214 on a mobile computing device, and exemplary means for visually distinguishing dynamic thumbnail images 114 corresponding to updated web pages 214 from dynamic thumbnail images 114 corresponding to unchanged web pages 214 on a mobile computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for providing dynamic thumbnail images corresponding to web pages on a mobile computing device, said system comprising:
   a memory area associated with a mobile computing device, said memory area storing a plurality of web pages accessed by a user, said memory area further storing a dynamic thumbnail image of one or more of the plurality of web pages;
   a display including a tile user interface and a browser user interface; and
   a processor programmed to:
      display, to the user in the tile user interface, one or more of the dynamic thumbnail images stored in the memory area;
      subsequently update one or more of the web pages stored in the memory area;
      for each of the updated web pages,
         re-create the dynamic thumbnail image of the web page; and
         visually distinguish the re-created image from the dynamic thumbnail images corresponding to web pages that have not been updated; and
      display the visually distinguished, re-created dynamic thumbnail images to the user in the tile user interface to enable the user to determine, without executing an application associated with the one or more of the web pages, that the one or more of the web pages have been updated.

2. The system of claim 1, wherein the processor is further programmed to display the updated web pages to the user in the browser user interface.

3. The system of claim 1, wherein the tile user interface comprises one or more of the following: a home screen and a desktop background.

4. The system of claim 1, wherein the processor is programmed to subsequently update the one or more of the web pages stored in the memory area by updating, based on a state of the mobile computing device, the one or more of the web pages.

5. The system of claim 4, wherein the state of the mobile computing device corresponds to one or more of the following: battery level, roaming status, signal strength, user interaction with the mobile computing device, quantity of applications executing on the mobile computing device, available memory capacity, and bootup progress.

6. The system of claim 1, wherein each of the dynamic thumbnail images stored in the memory area represents a snapshot of at least a portion of the web page corresponding thereto.

7. The system of claim 1, further comprising means for providing dynamically updated thumbnail images corresponding to the one or more of the updated web pages on a mobile computing device.

8. The system of claim 1, further comprising means for visually distinguishing dynamic thumbnail images corresponding to the one or more of the updated web pages from dynamic thumbnail images corresponding to unchanged web pages on a mobile computing device.

9. A method comprising:
   displaying, to a user in a tile user interface on a computing device, dynamic thumbnail images for a plurality of web pages, wherein one or more of the web pages are subsequently updated;
   for each of the updated web pages,
      re-creating the dynamic thumbnail image of the web page; and
      visually distinguishing the re-created image from the dynamic thumbnail images corresponding to web pages that have not been updated; and
   displaying the visually distinguished, re-created dynamic thumbnail images to the user in the tile user interface to enable the user to determine, without executing an application associated with the one or more of the web pages, that the one or more of the web pages have been updated.

10. The method of claim 9, further comprising:
    detecting an interaction between the user and at least one of the dynamic thumbnail images; and
    performing an action associated with said at least one of the dynamic thumbnail images.

11. The method of claim 9, further comprising subsequently updating one or more cached web pages.

12. The method of claim 11, wherein subsequently updating said one or more cached web pages comprises:
    accessing a header of each of the plurality of web pages to determine if one or more of the plurality of the web pages have changed; and
    downloading updated versions of the one or more of the plurality of web pages based on the accessed header.

13. The method of claim 9, wherein visually distinguishing the re-created image comprises applying one or more of the following to the re-created image: a highlighted border, a blinking portion, a zoom scale factor, and an arrow.

14. The method of claim 9, wherein visually distinguishing the re-created image comprises altering the re-created image.

15. The method of claim 9, wherein displaying the dynamic thumbnail images in the tile user interface comprises displaying the dynamic thumbnail images to the user on a home screen of a mobile telephone or on a background of a desktop computer.

16. The method of claim 9, wherein displaying the dynamic thumbnail images to the user comprises displaying the dynamic thumbnail images to the user outside the context of a browser application executing on the computing device.

17. One or more computer storage media embodying computer-executable components, said components comprising:
    a browser component that when executed causes at least one processor to cache a plurality of web pages accessed by a user with a computing device;
    a user interface component that when executed causes at least one processor to receive a request from the user to create a thumbnail image of at least one of the web pages cached by the browser component, said user interface component further creating and providing the thumbnail image for display to the user on the computing device in response to the received request, wherein the browser component subsequently updates the web page corresponding to the created thumbnail image; and
    a notification component that when executed causes at least one processor to re-create the thumbnail image corresponding to the updated web page and to alter the re-created thumbnail image to indicate to the user that the corresponding web page has been updated, wherein the user interface component presents the altered, re-created image for display to the user on the computing device to enable the user to determine, without executing an application associated with the web page, that the web page has been updated.

18. The computer storage media of claim 17, wherein the user interface component further receives a request from the user via the re-created thumbnail image to display the updated web page, and wherein the browser component executes a browser to display the updated web page to the user.

19. The computer storage media of claim 17, wherein the user interface component further:
- creates a plurality of thumbnail images each corresponding to a different web page, said created plurality of thumbnail images exceeding a predefined quantity available for display on the computing device; and
- displays only the predefined quantity of the plurality of thumbnail images.

20. The computer storage media of claim 19, wherein the notification component provides an indicator to the user that at least one of the created plurality of thumbnail images not displayed on the computing device has an updated web page corresponding thereto.

* * * * *